3,231,237
REVERSIBLE PRESSURE FLUID DRIVEN MOTOR
Sven Erik Wermström, Nacka, Sweden, assignor to Atlas Copco Aktiebolag, Nacka, Sweden, a corporation of Sweden
Filed Oct. 22, 1962, Ser. No. 232,095
7 Claims. (Cl. 253—3)

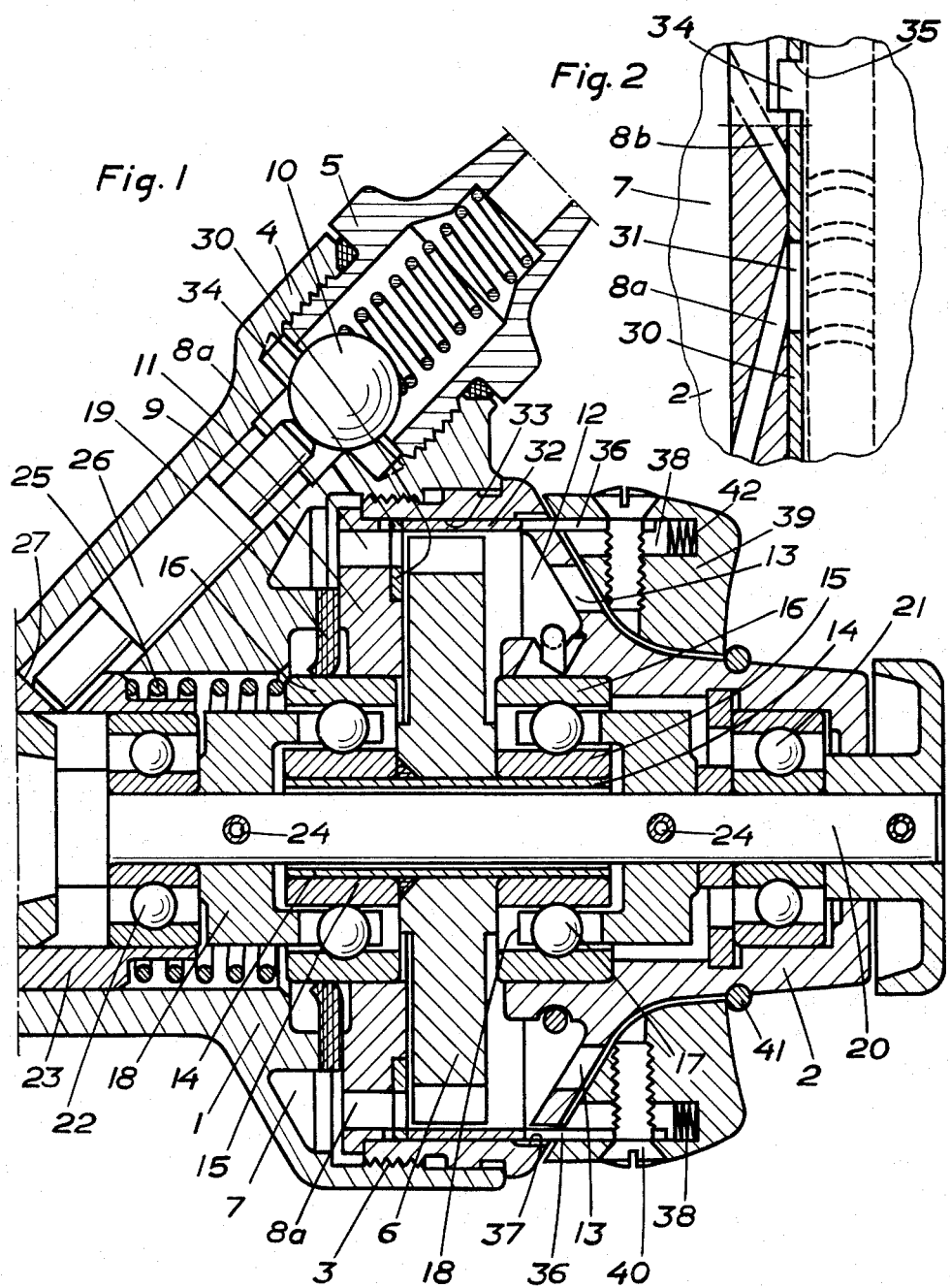

This invention relates to reversible pressure fluid driven motors for self contained dental engines, grinding machines, drilling machines or the like. One object of the invention is to provide a reversing mechanism for pressure fluid driven motors of the above type which is of simple construction and extremely small weight and which interferes very little with the general design of like motors of the above type as used for instance in self-contained dental engines. In such engines the driving motor for the dental drill or grinding disc or other tool is located at the rear end or at the tool end of a hand piece. The invention may, for instance, be applied to machines of the type described in the assignees, U.S. Patent 2,855,671, but also in machines such as described in U.S. Patents 2,891,312, 3,032,878 or the like. A further object of the invention is to provide a reversing mechanism which does not increase the external dimensions of the machines. A still further object of the invention is to provide a reversing mechanism in which the leakage losses are reduced to a minimum.

In the accompanying drawing one embodiment of a reversible motor for a machine according to U.S. Patent 2,855,671 is illustrated by way of example. FIG. 1 is a longitudinal cross section of the motor, and FIG. 2 is a side view of a part of the motor with the motor housing broken away showing the fluid passages and the operating mechanism for the reversing gear.

The dental engine motor illustrated in the drawing is provided with a motor housing comprising a front section 1 and a rear section 2 which is screw threaded in the front section at 3. The front section 1 forms a socket 4 accommodating a hose connection 5 through which compressed air is supplied to the motor from a suitable source. A compressed air driven rotor 6 is rotatably mounted in the motor housing and consists of a turbine wheel which is supplied with driving air from an annular admission chamber 7 in the front section 1 through nozzles 8a or 8b in a partition 9 for forward rotation and reverse rotation, respectively, of the turbine wheel 6. The nozzles 8a are directed for forward rotation of the turbine rotor and the nozzles 8b for reverse rotation. Instead of a turbine a sliding vane motor or any other suitable rotary air motor may naturally be employed. The compressed air supply to the admission chamber 7 is controlled by a spring loaded ball valve 10 disposed in the socket 4. From the valve housing formed by the hose connection 5 and the socket 4 a passage 11 leads to the annular admission chamber 7. The air from the turbine wheel 6 flows into an annular chamber 12 and from there to the atmosphere through openings 13 directed rearwardly and arranged in the rear section 2 of the housing. The turbine wheel 6 is secured on a tubular body forming axially extending hub portions 14 fitted in ball bearings one at each end of the turbine wheel. These ball bearings consist of inner races 15, outer races 16 and sets of balls 17 and ball retainers 18. The outer races 16 of the rear ball bearing is press fitted into the rear section 2 of the motor housing, whereas the forward ball bearing has an outer race 6 axially movable in the partition and kept from turning by an annular disc 19 of rubber or other suitable flexible material. A motor shaft 20 extends freely through a central bore in the turbine wheel 6 and the axial extensions 14, and is mounted for rotation in two ball bearings 21 and 22. The ball bearing 21 is fitted in the rear section 2 of the motor housing whereas the ball bearing 22 is fitted in a sleeve 23 in the front section 1 which sleeve is axially movable relative to the ball bearing 22. The ball retainers 18 form means for transmitting rotary motion of the balls 17 around the turbine axis to the shaft 20. For this purpose the ball retainers 18 are connected to the shaft 20 by means of pins 24 extending transversely through the ball retainers and the shaft. In view of the fact that the balls 17 rotate around the turbine axis which is the longitudinal axis of the dental engine with a number of revolutions which is less than the number of revolutions of the turbine wheel 6, the balls function substantially as the planetary wheels of a planetary friction gear, the number of revolutions of the shaft 20 being less than half the number of revolutions of the turbine wheel 6. The ability of the ball retainer 18 to transmit a torque to the shaft 20 naturally depends on the frictional contact between the balls 17 and the inner races 15 and outer races 16. In order to maintain such frictional contact, the axially movable outer race 16 of the forward bearing is loaded or biased by a spring 25 in the direction towards the turbine wheel. The spring 25 transmits axial pressure to the outer race 16 and is fitted between said race and the sleeve 23 which is also axially movable in the motor housing section 1. A rod 26 is slidable lengthwise of the socket 4 and engages an inclined recess or slot 27 in the sleeve 23, and also serves to prevent the sleeve 23 from turning in the front section 1 around the longitudinal axis of the dental engine. Displacement of the sleeve 23 in the direction towards the rear section 2 of the motor housing causes displacement of the rod 26 due to the shape of the inclined bottom of the recess 27 on which the rod 26 rests. Said displacement lifts the valve 10 from its seat and opens the air supply to the turbine.

A hand piece may be detachably inserted in the front section 1 of the motor housing as disclosed in U.S. Patent 2,855,671, but this hand piece is not illustrated in the drawing since it does not form a part of the present invention. A thin gate plate 30 is rotatably mounted in the housing section 2 at the rear end of the partition wall 9, i.e. at the outlet side of the passages 8a and 8b, where the pressure of the fluid flowing through the passages is substantially reduced and converted into speed. The gate plate has openings 31 which in a first position of the gate plate register with the outlet openings of the forward rotation passages 8a and in a second position with the reverse rotation passages 8b. When the gate plate uncovers the passages 8a the passages 8b are covered, and vice versa. A tubular sleeve 32 is mounted to turn in a bore 33 in the housing section 1 and surrounds the turbine wheel 6. The tubular sleeve 32 has two axial extensions or lugs 34 engaging corresponding recesses 35 in the gate plate 30 so that turning of the tubular sleeve 32 through a certain angle turns the gate plate 30 through the same angle. The tubular sleeve 32 has further two rearwardly extending lugs 36 which project through arcuate slots 37 in the housing section 2 into recesses 38 in an operating ring or member 39. Screws 40 in the member 39 extend through corresponding openings in the lugs 36 to retain the lugs in the recesses 38. A ring 41 fitted in a groove in the housing section 2 retains the member 39 on the housing section and springs 42 in the recesses 38 act upon the lugs 36 to force the gate plate 30 towards the partition 9.

In operation when it is desired to reverse the direction of rotation of the turbine rotor 6, the operating member 39 is turned in the desired direction causing movement of the lugs 36 in the arcuate slots 37 and turning of the gate plate 30 by means of the lugs 34 engaging the recesses 35 of the gate plate. Such turning may bring the openings 31 in register with the passages 8a causing forward rotation of the turbine. When the member 39 is rotated in reverse direction the openings 31 are brought into register with the passages 8b whereas passages 8a are closed and the turbine wheel is consequently rotated in reverse direction.

The dental machine above described and illustrated in the drawing should only be considered as an example and the invention may be modified in several different ways within the scope of the following claims. When the invention is applied to dental engines or other motors such as disclosed in U.S. Patents 2,891,312 and 3,032,878 the sleeve 32 may form a gate plate provided with suitable openings corresponding to the openings 31 and serving the same purpose. The invention may naturally be used in other portable pressure fluid driven machines such as hand held air drills or grinders or rotary files or nut runners or the like.

What I claim is:

1. In reversible pressure fluid driven portable dental drills, rotary grinders and drills, and like tools, the combination which comprises a motor housing, a pressure fluid driven vaned turbine rotor mounted for rotation in said housing, a pressure fluid admission chamber in said housing at one end of said rotor and having first fluid admission passages for directing fluid flow toward one side of said vanes for forward rotation of said rotor and second fluid admission passages for directing fluid flow toward the opposite side of said vanes for reverse rotation of said rotor, fluid outlet passages in said housing and separate from said fluid admission passages for conducting fluid away from said rotor and disposed at the end thereof opposite said fluid admission chamber, means for selectively opening and closing each of said first and second admission passages immediately adjacent said rotor, and means outside said housing and at the end of said rotor opposite to said admission chamber for manipulating said selective opening and closing means.

2. Apparatus as described in claim 1 and including a wall disposed between said fluid admission chamber and said rotor and in which said means for opening and closing said admission passages is disposed on the side of said wall adjacent said rotor and separated from said fluid admission chamber.

3. Apparatus as recited in claim 2 in which said means for selectively opening and closing said admission passages is a gate plate disposed against said wall on the rotor side thereof, and which includes a tubular sleeve movably disposed around said rotor and engaging said gate plate, said manipulating means being disposed on said sleeve at the end thereof opposite said gate plate for moving said gate plate into opening and closing positions.

4. Apparatus as recited in claim 3 in which said manipulating means outside said casing includes a spring for engaging and biasing said sleeve in a direction toward said admission chamber for urging said gate plate into sealing engagement against said wall.

5. In reversible pressure fluid driven portable dental drills, rotary grinders and drills, and like tools having a motor housing with a pressure fluid driven vaned axial flow turbine rotor mounted for rotation therein, the combination which comprises a pressure fluid admission chamber in said housing at one end of said rotor, a wall disposed in said housing between said admission chamber and said rotor and having first fluid admission passages for directing fluid flow toward one side of said vanes for forward rotation of said rotor and second fluid admission passages for directing fluid flow toward the opposite side of said vanes for reverse rotation of said rotor, fluid outlet passages in said housing at the end thereof opposite said fluid admission passages for conducting fluid away from said rotor, a gate valve rotatably disposed in said housing on the side of said wall adjacent said rotor for selective movement with respect to said first and second passages from a first position admitting fluid to said rotor from said first passages only to a second position admitting fluid to said rotor from said second passages only with said gate valve having cutaway portions for accommodating said first and second positions, and means adjacent said outlet passages at the outside of said housing for selectively manipulating said gate valve into any of said positions.

6. In reversible pressure fluid driven portable dental drills, rotary grinders and drills, and like tools, the combination which comprises a motor housing, a pressure fluid driven vaned rotor mounted for rotation in said housing, separate forward and reverse rotation fluid admission passages in said housing for separately and selectively conveying pressure fluid to said rotor for the driving thereof in different directions, fluid outlet passages in said housing separate from said fluid admission passages for conducting fluid away from said rotor at the outlet side thereof, movable gate valve means in said housing between said fluid admission passages and said rotor and in sealing engagement with said fluid admission passages, said gate valve means including spaced openings selectively movable to register separately with said forward and reverse rotation fluid admission passages with sealing surfaces between said openings for selectively opening and sealing said passages upon movement of said gate valve means, operating means on the outside of said housing and disposed thereon adjacent said outlet openings and at the outlet side of said rotor for operating said gate valve means from a position where said openings in said gate valve means are in register with said forward rotation fluid admission passages to a position where said openings are in register with said reverse rotation fluid admission passages, and means interconnecting said operating means outside said housing and said gate valve means inside said housing for the operation of said gate valve means by said operating means notwithstanding the disposition of said gate valve means adjacent said fluid admission passages and said operating means outside said housing at the outlet side thereof.

7. Apparatus as recited in claim 6 in which said gate valve is rotatably mounted in said housing for movement from a first position admitting fluid to said rotor for forward rotation only to a second position admitting fluid to said rotor for reverse rotation only with said valve having cutaway portions for accommodating said first and second positions, an arcuate slot in said housing, means connected to said valve and extending through said slot to the outside of said housing for moving said gate valve from said first to said second position and vice versa, and a rotatable operating member mounted outside said housing for limited rotation in relation thereto and in operative engagement with said connecting means.

References Cited by the Examiner
UNITED STATES PATENTS

| | | | |
|---|---|---|---|
| 164,495 | 6/1875 | Sturges | 253—142 |
| 758,595 | 4/1904 | Kierzkowski-Steuart | 253—73 |
| 863,524 | 8/1907 | Flatau | 253—73 |
| 2,081,611 | 5/1937 | Westman | 253—73 |
| 2,128,157 | 8/1938 | Monnier et al. | 253—2 |
| 2,172,195 | 9/1939 | Elson | 253—137 X |
| 2,492,966 | 1/1950 | Ckola | 253—3 |
| 2,569,898 | 10/1951 | Millns | 253—59 |
| 2,855,671 | 10/1958 | Lundgren et al. | 253—3 X |

MARK NEWMAN, *Primary Examiner.*

WALTER BERLOWITZ, SAMUEL LEVINE,
*Examiners.*